United States Patent Office 3,712,885
Patented Jan. 23, 1973

---

3,712,885
PURINE-RIBOFURANOSIDE - 3',5' - CYCLO-PHOSPHATES AND PROCESS FOR THEIR PREPARATION
Gunter Weimann, Bergerstrasse 159, Percha, Germany; Erich Haid, Gartenstrasse 5, Weilheim, Germany; Klaus Mühlegger, Riedenerweg 52, Starnberg, Germany; Hans Ulrich Bergmeyer, Brahmsweg 6, Tutzing, Upper Bavaria, Germany; Karl Dietmann, Amalie-Sieveking-Weg 11, Mannheim-Waldhof, Germany; and Gerhard Michal and Michael Nelboeck-Hochstetter, both of Bahnhofstrasse 5a, Tutzing, Upper Bavaria, Germany
No Drawing. Filed Sept. 8, 1969, Ser. No. 9,468
Claims priority, application Germany, Sept. 10, 1968, P 17 95 308.1; Apr. 30, 1969, P 19 22 172.8; Apr. 3, 1969, P 19 22 173.9
(Filed under Rule 47(a) and 35 U.S.C. 116)
Int. Cl. C07d 51/54
U.S. Cl. 260—211.5 R 30 Claims

ABSTRACT OF THE DISCLOSURE

Novel purine-ribofuranoside-3',5'-cyclophosphate compounds of the formula:

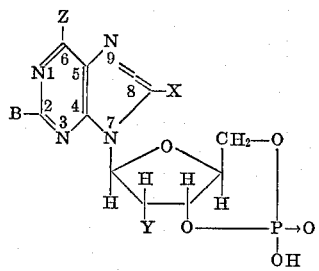

wherein B is a hydrogen atom or a hydroxyl or amino group; Z is a halogen atom, an ether group or a mono- or disubstituted amino group when X is a hydrogen atom and otherwise Z is a hydrogen atom, a hydroxyl group or an unsubstituted amino group, Y is a hydroxyl group or, when X is other than a hydrogen atom, Y is a hydrogen atom and X is a hydrogen or halogen atom, a hydroxyl group, an ether group, a sulphhydryl group, a thioether group or an unsubstituted or substituted amino group; and the salts thereof, are provided; these compounds can be prepared by reacting the corresponding cyclophosphate wherein Y and Z in the above formula are hydroxy, and X is hydrogen, with (a) phosphorus oxyhalide after acylation or (b) molecular halogen in alkaline medium, to form the corresponding (a) 6-halo or (b) 8-halo compound, and the 6- or 8-halo compound thereby obtained is converted, if necessary, into the corresponding desired compound by, e.g., reacting the halo compound with an alcohol or alcoholate to give the corresponding ether; or with ammonia or an amine to give the corresponding amino compound; or with hydrazine to give the corresponding hydrazide; or with thiourea or an alkyl sulfide to give the corresponding sulphhydryl compound, which can in turn be converted to the thioether compounds.

The present invention is concerned with new purine-ribofuranoside-3',5'-cyclophosphates and with the preparation thereof.

It has recently been found that adenosine 3',5'-cyclophosphate (A-3',5'-MP) plays an extraordinarily important part in metabolism. This cyclophosphate is formed by the enzyme adenylcyclase from adenosine triphosphate, with the cooperation of adrenaline and other catechlo-amines, glucagon, the adrenocorticotropic hormone (ACTH), the luteinising hormone (LSH), the thyreo-tropic hormone (TSA) and others and appears to transmit the action of the above-mentioned hormones as a "second messenger." The effect of the above-mentioned hormones, which are to be regarded as being a "first messenger," is to be seen from the fact that adenylcyclase is activated by them and this in turn forms A-3',5'-MP, which then displays the actual tissue effect. This will be explained briefly using, as an example, the action of the peptide hormone ACTH. ACTH, which is secreted by the pituitary hypophysis, passes via the blood stream to the adrenal cortex, the cell walls of which contain the enzyme adenylcyclase and which, upon receiving the extracellular ACTH signal, forms adenosine-3',5'-cyclophosphate intracellularly from adenosine triphosphate, this cyclophosphate in turn bringing about the biosynthesis and secretion of corticosteroids. The conditions in the case of glycogenolysis, lipolysis and the like are similar. The selectivity is thus provided by the receptors of the resultant organs in question which accept adenosine-3',5'-cyclophosphate as an intracellular signal.

Consequently, A-3',5'-MP is of extreme importance. However, the compound also has important disadvantages which contraindicate its pharmaceutical use. Thus, A-3',5'-MP is decomposed by the widely distributed enzyme phosphodiesterase, with opening of the 3'-bond, so that its effectiveness is again quickly lost. Furthermore, the action of A-3',5'-MP is relatively non-specific and brings about, to the same extent, glycogenolysis, lipolysis, steroid secretion and the like. The bringing about of such multiple actions is pharmacologically frequently undesirable.

Therefore, there is a need for the provision of analogous cyclophosphate compounds which not only exhibit an improved specificity of action but are also less quickly broken down and thus have a longer period of action.

We have now found a new group of compounds which exhibit these desirable properties. In particular, the new compounds of the present invention exhibit a substantially better resistance to fission by phosphodiesterase, as well as a stimulation of lipolysis which is clearly more marked than the stimulation of glycogenolysis.

The new compounds according to the present invention are purine-ribofuranoside-3',5'-cyclophosphates of the general formula:

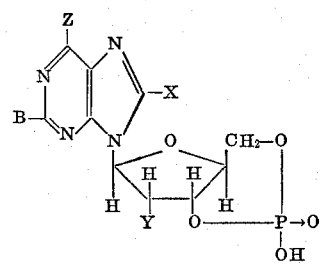

wherein B is a hydrogen atom or a hydroxyl or amino group, Z is a halogen atom, an ether group or a mono- or disubstituted amino group when X represents a hydrogen atom and otherwise Z is a hydrogen atom, a hydroxyl group or unsubstituted amino group, Y is a hydroxyl group or, when X is other than a hydrogen atom, Y is a hydrogen atom and X is a hydrogen or halogen atom, a hydroxyl group, an ether group, a sulphhydryl group, a thioether group or an unsubstituted or substituted amino group; and the salts thereof.

A preferred group of compounds according to the present invention has the above-given general Formula I in which either Z is a hydrogen atom or a hydroxyl or amino group and X is a bromine, chlorine or iodine atom or a hydroxyl group or an alkoxy, aralkoxy, aryloxy, sulphhydryl, alkylthio, aralkylthio, arylthio or —$NR_1R_2$ radical, wherein $R_1$ and $R_2$, which may be the same or different, are hydrogen atoms, amino groups, saturated or unsaturated, straight or branched chain aliphatic hydrocarbon radicals, or saturated or unsaturated cycloaliphatic or araliphatic radicals or aryl radicals, the aromatic rings of which substituents optionally contain halogen atoms, hydroxyl groups and alkoxy and/or dioxyalkylene radicals and the alkyl radicals of which optionally contain hydroxyl groups, or $R_1$ and $R_2$, possibly together with a further atom, can be joined together to form a saturated or unsaturated heterocyclic ring; or Z is a halogen atom, an ether group or an —$NR_3R_4$ radical, wherein $R_3$ and $R_4$, which can be the same or different, are saturated or unsaturated, straight or branched chain aliphatic hydrocarbon radicals or aryl or aralkyl radicals and $R_3$ can also be a hydrogen atom, the aromatic rings of which can be substituted by halogen atoms, or alkyl or alkoxy radicals and the alkyl radicals of which can be substituted by hydroxyl groups, or $R_3$ and $R_4$ can together, possibly with a further hetero atom, form a heterocyclic ring and X is a hydrogen atom.

In a more particularly preferred group of compounds according to the present invention, which also have the above-given general Formula I, X is a bromine atom, a hydroxyl group, a lower alkoxy radical, an aralkoxy radical, a sulphhydryl group, a lower alkylthio ether group or an —$NR_1R_2$ radical, wherein $R_1$ and $R_2$, which may be the same or different, are hydrogen atoms, amino groups or lower alkyl, lower alkenyl, aryl or aralkyl radicals which can possibly be substituted in the alkyl radicals by hydroxyl groups and in the aromatic rings by halogen, hydroxyl, lower alkoxy, dioxy-lower-alkylene and/or lower alkyl radicals or, possibly together with a further nitrogen or oxygen atom, are joined together to form a heterocyclic ring, and Z is a hydrogen atom or a hydroxyl or amino group; or X is a hydrogen atom and Z is a chlorine atom, an alkoxy radical, especially lower alkoxy radical, or an —$NR'_3R'_4$ radical, wherein $R'_3$ and $R'_4$, which may be the same or different, are lower alkyl radicals, lower alkenyl radicals, aryl radicals or aralkyl radicals, which can possibly be substituted in the aromatic rings by lower alkyl radicals, halogen atoms, hydroxyl groups or lower alkoxy radicals and can possibly be substituted in the alkyl chain by hydroxyl groups, and $R'_3$ can also represent a hydrogen atom or $R'_3$ and $R'_4$ can together possibly with a further hetero atom, form a saturated or unsaturated heterocyclic ring.

Within the scope of the description of the present invention and in the claims, an alkyl or cycloalkyl radical is to be understood as being straight or branched chain and containing up to 18 carbon atoms, a lower alkyl radical is to be understood as being straight or branched chain and containing up to 8 carbon atoms and an aralkyl radical is to be understood to contain up to 8 carbon atoms, the alkyl radical of which can be straight or branched. For alkoxy, aralkoxy, alkylthio, aralkylthio, unsaturated alkyl, lower alkenyl, lower alkoxy and dioxy-lower-alkylene radicals, the same is to be understood with regard to the number of carbon atoms present therein.

With regard to their chemical structure the new compounds can be regarded as being derived from adenosine-3',5'-cyclophosphate or from the corresponding cyclophosphates of other purines by the replacement of the functional group in the 6-position or of the hydrogen atom in the 8-position by one of the groups defined above as Z and X.

The synthesis of modified analogues of adenosine-3',5'-cyclophosphate derivatives has hitherto been carried out by very laborious and expensive routes which can be illustrated using as an example the synthesis of 6-mercapto-purine-ribonucleoside-3',5'-cyclophosphate:

Inosine→conversion into 2',3',5'-tribenzoylinosine→reaction with phosphorus pentasulphide to give 6-mercapto-purine-ribonucleoside→removal of the protective group and introduction of a new protective group on the 2',3'-hydroxyl group (e.g. by ketalisation), whereby the 5'-hydroxyl group remains free→phosphorylation of the 5'-hydroxyl group with β-cyanoethyl phosphate and DCC as condensation agent→splitting off (a) of the 2',3'-hydroxyl protective group and (b) of the phosphate protective group→cyclization to the desired product.

The yields in this multi-step synthesis are very low (1.5% of theory; J. Thomas, Montgomery J. Med. Pharm. Chem., 11, 44/1968) since, from the very outset, the mercapto group, which is sensitive to hydrolysis and oxidation, must be exposed to the individual reaction steps.

In an analogous manner, various derivatives of deazapurine-ribonucleoside-3',5'-cyclophosphate (tubercidine) have been prepared (U.S. patent specification No. 3,300,-479; A. Hanze, Biochemistry, 7, 932/1968); as well as of cytosine-arabinoside-2',5'-cyclophosphate.

Because of their laboriousness and low yields, the above-described methods of synthesis cannot be used for an industrially applicable process. Therefore, ways have been sought, starting from the *preformed* cyclophosphate compound, of introducing substitution into the 6- or 8-position of the purine skeleton.

The following processes are known for the replacement of the hydroxyl group by a chlorine atom in the case of nucleosides:

(1) chlorine in methanol (G. D. Daves et al., J.A.C.S., 82, 2633/1960; F. Bergman et al., J.C.S., 1966, 10);
(2) concentrated hydrochloric acid, gaseous chlorine and methanol (Gerster et al., J. Org. Chem., 28, 945/1963);
(3) diethyl-aniline and phosphorus oxychloride (Gerster et al., J. Org. Chem., 28, 945/1963); and
(4) thionyl chloride in dimethyl formamide (M. Ikehara, Chem. Pharm. Bull., 12, 267/1964).

It has, however, been found that none of these known processes lead to the desired product when applied to 6-hydroxy-purine-ribonucleoside-3',5' - cyclophosphate. Experiments have shown that either an extensive degradation occurs or the starting material does not react at all. This shows that the reactivity, in the case of the introduction of a cyclophosphate group into the purine nucleus, is also fundamentally changed and, therefore, the processes known for the purine nucleosides cannot be applied to the cyclic nucleoside-3',5'-phosphates. The same also applies for the conversion, known from the nucleoside series, of inosine into the corresponding 6-mercapto derivative by reaction with phosphorus pentasulphide. This reaction, which proceeds smoothly with nucleosides, cannot be carried out on the *preformed* cyclophosphate and, under no conditions, leads to the desired 6-mercapto derivative. Moreover many nucleoside-5'-phosphates cannot be subjected to known cyclization processes without extensive degradation.

In Japanese patent specification No. 7,957/68, there has already been described the preparation of 6-chloro-purine-desoxyriboside-3',5'-cyclophosphate from the corresponding 6-hydroxy compound by the action of phosphorus oxy-trichloride and of an alkaline substance, such as an inorganic alkali or an aliphatic or aromatic amine. This known process gives yields of 26%.

However, we have found that this reaction cannot be carried out on 6 - hydroxy-purine-ribonucleoside - 3',5'- cyclophosphate. In the presence of bases, for example of diethyl-aniline, under the conditions of the known process, the desired conversion does not take place: the reaction medium becomes a black-brown colour and contains numerous decomposition products.

The preparation of the new compounds of general Formula I takes place, according to the present invention, from *preformed* cyclophosphate. In principle, the introduction of a halogen atom into the 6- or 8-position first takes place and this can then be exchanged, in the course of a further reaction, by other substituents.

Thus, we have found, surprisingly, that the desired reaction in the 6-position proceeds smoothly and with very good yields when a 6-hydroxy-purine-ribonucleoside-3',5'-cyclophosphate starting material is first acylated in known manner and the acylation product then reacted directly with a phosphorus oxyhalide.

In this way, the corresponding 6-halopurine-ribonucleoside-3',5'-cyclophosphate is obtained in a yield of more than 50%.

As starting material for the process according to the present invention, there is used a 6-hydroxy-purine-ribonucleoside-3',5' - cyclophosphate of the general formula:

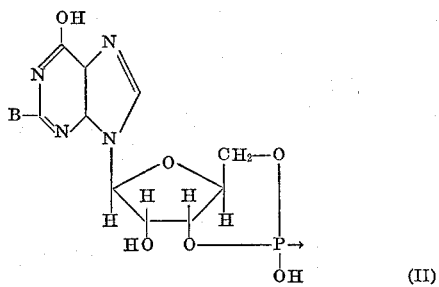

wherein B has the same meaning as above.

This starting material can easily be obtained in high yields by the chemical desamination of, for example, adenosine-3',5'-cyclophosphate.

In the first step of the process according to the present invention, the starting material is acylated in order to make it soluble in the phosphorus oxyhalide. The acylation must only be carried out to such an extent that the acylated product is sufficiently soluble in the phosphorus oxyhalide. The acylation is preferably carried out with an acyl chloride or acyl anhydride in the presence of an alkaline agent. The acylation is preferably carried out with acetyl chloride, acetic anhydride or benzoyl chloride. As alkaline agents, there are preferably used nitrogen-containing organic bases which, together with excess acylation agent, can easily be separated from the acylated nucleoside by distillation. The reaction with acetic anhydride in pyridine has proved to be particularly suitable and this can be carried out without difficulty at ambient temperature. In this case, there is formed 6 - hydroxy-purine-2'-O-acetyl-ribonucleoside-3',5' - cycloacetyl-phosphate, which is readily soluble in phosphorus oxyhalides and is, therefore, particularly well suited for the reaction. 2'-O-acetyl-6-hydroxy-purine-ribonucleoside-3',5' - cyclophosphate is also suitable but, because of its lower solubility, the yields are poorer.

At the end of the acylation, excess acylation agent and the base are removed, preferably by distillation. The remaining oily acylation product is reacted directly with excess phosphorus oxyhalide, preferably with excess phosphorus oxychloride. The phosphorus oxyhalide hereby serves not only as reagent but also as solvent. In the absence of a basic substance, such as diethyl-aniline, the desired 6-halo-purine-ribonucleoside-3',5'-cyclophosphate is formed in a short time in a yield of more than 50%, 6-halopurine being formed as the main by-product.

The acylation in the first step of the process according to the present invention takes place in the usual way, preferably at ambient temperature. The reaction is preferably carried out with the exclusion of light. After removal of the residual acylation agent and of the alkaline substance, the remaining oil is preferably freed from the last traces of alkaline substance and acylation agent by washing with a suitable solvent, such as ether. The acylation reaction can be carried out at temperatures between 0° C. and the reflux temperature of the lowest boiling component of the reaction mixture.

The reaction with excess phosphorus oxyhalide can also be carried out at temperatures between ambient temperature and reflux temperature. It is preferable to carry out the reaction at an elevated temperature, especially by boiling under reflux. Under these conditions, the reaction is finished after about 15 to 60 minutes and excess phosphorus oxyhalide is then distilled off. The purification of the thus obtained crude 6-halopurine-ribonucleoside-3',5'-cyclophosphate is advantageously carried out by chromatography on a suitable ion exchanger or silica gel.

The compounds according to the present invention in which Z is other than a halogen atom and X is a hydrogen atom are prepared, according to the present invention, by reacting a 6-halo derivative, prepared in the above-described manner, with an amine or an alcohol or with a reactive derivative thereof, with the formation of the desired compound in which Z is other than a halogen atom.

The 6-chloro derivative is preferably prepared with the use of phosphorus oxychloride at a temperature between ambient temperature and reflux temperature and reacted in aqueous or alcoholic solution with excess amine or alcoholate at a temperature between −10° C. and reflux temperature.

The purification of the products obtained takes place by the methods conventional in nucleoside chemistry. Good results are obtained with chromatographic purification. For this purpose, there are preferably used anion exchangers, activated charcoal or silica gel.

The introduction of the halogen in the 8-position takes place, according to the invention, by the reaction of the cyclophosphate in dilute alkaline solution with a molecular amount of halogen, preferably of bromine, at a temperature within the range of −10 to 75° C. The reaction is desirably carried out at ambient temperature and an approximately 0.05–0.5 N solution of alkali is used.

Due to the hydrogen halide liberated in the course of the reaction, the reaction medium becomes strongly acidic. Compounds in which Y is a hydrogen atom, i.e. desoxyribonucleotides, are, under these conditions, split at the N-glycosidic bond. In the case of the preparation of the 8-halo compounds, the reaction is, therefore, carried out in a neutral medium.

The 8-halo compounds prepared in the described manner, especially the bromine compounds, are, in some cases, obtained directly in crystalline form, for example 8-bromo-A–3',5'–MP. If this is not the case, then the products can easily be purified in the usual manner, for example, by chromatography on suitable exchangers. "Dowex 1," for example in the form of the formate and with elution with formic acid, has hereby proved to be useful. ("Dowex" is a registered trademark.) The 8-halo compounds can be obtained directly from the eluate, possibly by precipitation by the addition of an organic solvent, such as ethanol or acetone.

The process according to the present invention for the preparation of the 8-halo derivatives is so gentle that even sensitive nucleotides and derivatives thereof can be halogenated without a protection of the functional amino and hydroxyl groups being necessary.

The compounds according to the present invention, in which X is other than a halogen or hydrogen atom, can be obtained by further reaction of the 8-halo compounds, preferably of the 8-bromo compounds. Thus, by the reaction of the 8-bromo derivatives with ammonia or with amines, there are obtained the corresponding 8-amino derivatives. In the case of a preferred embodiment of the process, either the amine itself is used as solvent or the reaction is carried out in alcoholic solution, preferably in ethanolic solution. The amine is expediently used in a 2 to 20 fold excess. The reaction expediently takes place at a temperature between 50 and 150° C. in alcoholic solution, preferably at the boiling point of the alcohol. In the case of an approximately tenfold excess of amine, the reaction time is, under these conditions, about 10 to 20 hours. In some cases, especially in the case of reaction with secondary amines, for example morpholine, the corresponding cyclophosphate precipitates out from the alcoholic solution. In this case, polar solvents, for example formamide, dimethyl sulphoxide or the like, are added in order to maintain a homogeneous solution.

If, instead of with an amine, the 8-halo compounds are reacted with an alcohol, then there are obtained compounds according to the present invention in which X is an ether group. In this case, alcoholates are preferably used. The reaction then takes place quickly, even at ambient temperature, and within a short period of time, for example of 20 to 100 minutes.

The 8-aralkoxy compounds according to the present invention can be split in an acidic medium to give the corresponding 8-hydroxy compounds. The process according to the present invention for the preparation of the 8-hydroxy compounds consists in reacting an 8-halo compound with an aralkylate to give the corresponding 8-aralkoxy compound and this is then split in an acidic medium with the formation of the 8-hydroxy compound. Preferably, the 8-bromo compound is reacted with sodium benzylate. A particularly advantageous method of working is to react the 8-bromo compound with a benzylate, preferably with an alkali metal benzylate, in an acidic medium. In this way, the 8-hydroxy compound is obtained directly.

According to the present invention, the 8-sulphhydryl and 8-thioether compounds are also prepared from the 8-halo compounds. By the reaction of the 8-halo compounds with thiourea or with an alkali metal hydrogen sulphide, there is obtained the corresponding 8-sulphhydryl compound. These can be converted by known methods into the 8-thioether compounds. For example, the 8-sulphhydryl compound is converted, by treatment with an alkyl iodide, aralkyl iodide or aryl iodide into the corresponding ether. An example of this is the treatment of the 8-sulphhydryl compound with methyl iodide, with the formation of the corresponding 8-methylthio ether.

As already mentioned, the compounds according to the present invention possess interesting pharmacodynamic properties and, furthermore, are valuable intermediates for the preparation of other new compounds. Whereas the naturally-occurring purine-nucleoside cyclophosphates, for example adenosine-3′,5′-monophosphate and guanosine-3′,5′-monophosphate, are split very quickly by phosphodiesterase and, even after parenteral administration, are only effective in high dosages, since they can only penetrate the cell walls with difficulty, the new compounds according to the present invention do not exhibit these disadvantages.

The compounds according to the present invention which are substituted in the 8-position were compared with the known compound which was the closest to them with regard to constitution and effectiveness, namely adenosine-3′,5′-cyclophosphate, with regard to stability against phosphodiesterase, as well as with regard to maximum activation of lipolysis and the new compounds proved to be far superior. In our experiments, the various compounds used were treated with phosphodiesterase from cardiac muscle (0.15 U/test) and with alkaline phosphates (for the splitting of the phosphate monoester formed by the phosphodiesterase; 8.8 U/test) at 37° C. for a period of 10 minutes. The liberated phosphate was then determined.

The stimulation of lipolysis was determined by Rizack's method (J. Biol. Chem., 239, 392/1964) but with the modification that adenosine triphosphate was omitted since it has a disturbing effect. The results of both determinations are set out in the following Table I.

The compounds are also characterised in that they first stimulate phosphorylase at higher concentrations than the known natural cyclophosphates. The determination was carried out by the method of E. G. Krebs et al. (Biochemistry, 3, 1023/1964) but in which the phosphorylase-b-kinase was replaced by a liver homogenisate according to the method of T. W. Rall and E. W. Sutherland (Colowick-Kaplan, Methods in Enzymology, 5, 377/1961). The results of these experiments are also given in the following Table I. In comparison with the standard compound, they exhibit an increased specificity by potentiating the lipolysis in comparison with the phosphorylase action.

TABLE I

Physiological-chemical properties of the new compounds compared with adenosine-3′,5′-cyclophosphate

| Substance | Stability against phosphodiesterase [1] | Max. activation of lipolysis at—(M) | Half-value activation of phosphorylase at—(M) | Quotient of the concentrations for lipolysis and phosphorylase stimulation |
|---|---|---|---|---|
| A-3′,5′-MP | [2] 98 | $4.10^{-5}$ | $7.10^{-8}$ | ca. 570 |
| 8-benzylamino-A-3′,5′-MP | | $1.10^{-7}$ | $2.10^{-6}$ | 0.05 |
| 8-(2-methylbenzyl-amino)-A-3′,5′-MP | 0 | $5.10^{-7}$ | $1.10^{-7}$ | 5 |
| 8-(4-methylbenzyl-amino)-A-3′,5′-MP | 0 | $2.10^{-7}$ | $1.10^{-6}$ | 0.2 |
| 8-(2-chlorobenzyl-amino)-A-3′,5′-MP | 8 | $2.10^{-6}$ | $1.10^{-7}$ | 20 |
| 8-(3,4-dioxymethyl-enebenzylamino)-A-3′,5′-MP | 22 | $5.10^{-7}$ | | |
| 8-[2-(3,4-dimeth-oxyphenyl)-ethyl-amino]-A-3′,5′-MP | 8 | $4.10^{-6}$ | | |
| 8-(2-phenylethyl-amino)-A-3′,5′-MP | 1 | $1.10^{-6}$ | | |
| 8-amylamino-A-3′,5′-MP | 1 | $1.10^{-6}$ | | |
| 8-hydroxy-A-3′,5′-MP | 4 | $6.10^{-7}$ | | |
| 8-piperidino-A-3′,5′-MP | 1 | $5.10^{-5}$ | $1.10^{-7}$ | 500 |
| 8-Mercapto-A-3′,5′-MP | 8 | $8.10^{-6}$ | | |
| 8-bromo-A-3′,5′-MP | 32 | $5.10^{-6}$ | $5.10^{-7}$ | 10 |
| 8-benzylamino-I-3′,5′-MP | 4 | $5.10^{-8}$ | | |
| 8-(4′-methyl-benzylamino)-I-3′,5′-MP | | $1.10^{-7}$ | | |

[1] Phosphate split off within a period of 10 minutes by phosphodiesterase and alkaline phosphates, expressed as a percentage.
[2] Splitting after 2 minutes, expressed as a percentage.

NOTE.—In the above table, A stands for adenosine and MP stands for cyclophosphate.

The compounds according to the present invention which are unsubstituted in the 8-position are superior in many respects to the best known compound with the same type of action and with a comparable chemical constitution, namely $N^6$-2′-O-dibutyryl-adenosine-3′,5′-monophosphate. In particular, they show the following advantages:

1. The activation of phosphorylase occurs at lower concentrations than in the case of the known compound.

2. The lipolysis activation of the compounds according to the present invention occurs either at the same or slightly lower concentration. The result is a displacement of the activity spectrum in favour of the phosphorylase activation which can be seen from the last column of following Table II from the concentration quotients for both types of activation. In comparison with a factor of 2 for the known compound, the activities of the compounds according to the present invention are displaced to a factor of 3 to 500. In some cases, the lipolytic activity is so weak that it is possible to speak of an almost purely phosphorylase effectiveness and thus of a high pharmacological specificity.

The results of these comparative experiments are set out in the following Table II:

TABLE II

Physiological-chemical properties of the 6-substituted-purine-ribofuranoside-3',5'-cyclophosphates (PR-3':5'-MP)

| Substance | Maximum activation of lipolysis at—(M) | Half-value activation of phosphorylase at—(M) | Quotient of the concentrations for lipase and phosphorylase activation |
|---|---|---|---|
| $N^{6}$-2'-O-dibutyryl-A-3':5'-MP | $4 \cdot 10^{-6}$ | $2 \cdot 10^{-6}$ | 2 |
| 6-benzylamino-PR-3':5'-MP | $1 \cdot 10^{-7}$ | $7 \cdot 10^{-9}$ | 14 |
| 6-(2-methylbenzylamino)-PR-3':5'-MP | $5 \cdot 10^{-6}$ | $1 \cdot 10^{-8}$ | 500 |
| 6-(4-methylbenzylamino)-PR-3':5'-MP | $5 \cdot 10^{-7}$ | $1 \cdot 10^{-7}$ | 5 |
| 6-(2-chlorobenzylamino)-PR-3':5'-MP | $5 \cdot 10^{-7}$ | $7 \cdot 10^{-9}$ | 71 |
| 6-(1-phenyl)ethylamino-PR-3':5'-MP | $3 \cdot 10^{-7}$ | $3 \cdot 10^{-8}$ | 10 |
| 6-(2-phenyl)ethylamino-PR-3':5'-MP | $1 \cdot 10^{-6}$ | | Large |
| 6-pentylamino-PR-3':5'-MP | $1 \cdot 10^{-4}$ | $7 \cdot 10^{-8}$ | Large |
| 6-(1-allylamino)PR-3':5'-MP | $1 \cdot 10^{-5}$ | $1 \cdot 10^{-7}$ | 100 |
| 6-ephedrinyl-PR-3':5'-MP | $1 \cdot 10^{-5}$ | $7 \cdot 10^{-7}$ | 14 |
| 6-morpholino-PR-3':5'-MP | $2 \cdot 10^{-7}$ | $7 \cdot 10^{-8}$ | 3 |
| 6-methoxy-PR-3':5'-MP | $10^{-3}$ | $1 \cdot 10^{-7}$ | Large |
| 6-chloro-PR-3':5'-MP | $2 \cdot 10^{-6}$ | $1 \cdot 10^{-7}$ | 20 |

Apart from influencing the carbohydrate metabolism, the new compounds according to the present invention possess further interesting activities, for example, a general energy-mobilising action which permits the use thereof for example, in cases of stress and shock. A further activity lies in the increasing of the adrenal steroid production, as well as in the treatment of asthma. The compounds according to the present invention also act as preformed nucleotides and can, therefore, exhibit, for example, an anti-metabolite action in the case of immunosuppression, as well as in the case of tumors. Furthermore, besides a general sedative action, in some cases a potentiation of the action of narcotics has also been observed. A positive inotropic cardiac effect has also been ascertained.

The following examples are given for the purpose of illustrating the present invention:

EXAMPLE 1

Barium salt of 6-chloropurine-ribofuranoside-3',5'-cyclophosphate 20 g. inosine-3',5'-cyclophosphate, crystallised in the form of the free acid, are suspended in 200 ml. pyridine and 200 ml. acetic anhydride and, with gentle warming, stirred until a clear, pale yellow solution is obtained. After 15 hours at ambient temperature, the solution is distilled to dryness in a vacuum. The remaining oil is vigorously shaken up twice with ether in order to remove the last traces of pyridine and acetic anhydride.

The residue is mixed with 500 ml. phosphorus oxychloride and boiled under reflux. After about 20–25 minutes, all the material has dissolved and the excess phosphorus oxychloride is distilled off in a vacuum. For the complete removal of excess phosphorus oxychloride, the residue is vigorously shaken up twice with ether, subsequently dissolved in 800 ml. 0.25 M disodium hydrogen phosphate dodecahydrate and the pH-value adjusted to 2.0 by the addition of a 10% aqueous solution of sodium hydroxide.

The yellow solution is applied to a chromatographic column filled with a Carboraffin C charcoal (length 120 cm., diameter 2.5 cm.) and then washed with distilled water until the runnings are free from phosphate and chloride ions. Elution is then carried out with ethanol:water:ammonium hydroxide (33%) (50:50:1). The fractions absorbing ultra-violet light at 260 m$\mu$ (or by thin layer chromatography using the system butanol:water:glacial acetic acid (50:25:15) on silica gel PF 254; $R_f = 0.6$) are combined and concentrated to a volume of 200 ml.

The concentrate is freed from cations via an ion exchanger column (Dowex 50 H$^+$ form; 1 metre long, 2 cm. diameter) and the acidic eluate neutralised to pH 7.0 with a solution of barytes. The precipitate obtained is centrifuged off, thoroughly washed with water and the supernatant concentrated to a volume of about 40–50 ml. This concentrate is now mixed with 500 ml. methanol and the precipitate formed is centrifuged off and washed with 80% methanol. The combined supernatants are adjusted to pH 10–11 with a solution of barytes and, after standing for 20 minutes at ambient temperature, neutralised with 2 N sulphuric acid to a pH of 7. The precipitate is centrifuged off, washed with a little 80% methanol and the combined solutions concentrated to 50 ml. The concentrate is first mixed with 100 ml. methanol and then 500 ml. ether. The precipitate formed is centrifuged off, washed twice with ether and then dried in a vacuum over anhydrous calcium chloride.

There are obtained 13 g. 6-chloropurine-ribofuranoside-3',5'-cyclophosphate barium salt, which corresponds to a theoretical yield of 51%, referred to 100% pure barium salt (0.5 Ba/molecule).

Analysis.—$C_{10}H_9N_4O_6ClPBa_{1/2}$. Calcd. (percent): P, 7.5; N, 13.4; Cl, 8.5; Ba, 16.5. Found (percent): P, 7.3; N, 13.2; Cl, 8.3; Ba, 16.8.

Chromatographic behavior: $R_f = 0.58$ (isopropanol/1 M ammonium acetate 5:2) (inosine-3',5'-cyclophosphate $R_f = 0.32$).

Electrophoretic behavior: Mobility in 0.05 M triethyl ammonium bicarbonate buffer, pH 7.5, 10 v./cm., 2 hours = 0.87 (inosine-3',5'-cyclophosphate = 1.0).

Ultraviolet spectrum:
$\lambda_{max} = 264$ m$\mu$
Quotient 250/260 m$\mu$ = 0.80
Quotient 280/260 m$\mu$ = 0.17
Quotient 290/260 m$\mu$ = 0.02

EXAMPLE 2

6-morpholino-purine-ribofuranoside-3',5'-cyclophosphate sodium salt 5 g. crude 6-chloropurine-riboside-3',5'-cyclophosphate in the form of the free acid (content of pure cyclophosphate about 60%) are dissolved in 20 ml. water, mixed with an excess (6 ml.) morpholine and maintained at 80° C. for one hour. After cooling, the greater part of the excess morpholine is removed by shaking up three times with ether. After acidification of the aqueous phase to pH 3 with acetic acid, it is applied to an anion exchanger column (Dowex 1X2, formate, 1 m. long, 1.5 cm. diam.), washed with 500 ml. water and eluted with a linear gradient with 2 litres water against 2 litres 1 M ammonium formate solution. All impurities are thereby removed. The desired product is eluted with 1.5 M ammonium formate solution, the eluate is desalinated through a carbon column (100 ml. content) and the product eluted with isopropanol:water:ammonia (50:50:1). After concentration in a vacuum and passage through a cation exchanger (Dowex 50, Na form), it is lyophilised. Yield: 3.5 g.=70% of theory.

Analysis. — $C_{14}H_{17}O_7N_5PNa \cdot 1H_2O$ (M.W. 439.31). Calcd. (percent): N, 15.93; P, 6.82; Na, 5.24; $H_2O$, 4.1. Found (percent): N, 16.3; P, 6.98; Na, 5.3; $H_2O$, 4.1.

EXAMPLE 3

6-(4-methyl-benzylamino)-purine-ribofuranoside-3′,5′-cyclophosphate sodium salt 5 g. crude 6-chloropurine-riboside-3′,5′-cyclophosphate in the form of the free acid (12.5 mmole, 67.5% of free acid) are dissolved in 50 ml. ethanol together with 4.5 g. 4-methyl-benzylamine and the reaction mixture heated for 1–2 hours under reflux. After distilling off the ethanol, the residue is taken up to 100 ml. water and extracted twice with 50 ml. amounts of ether in a separating funnel. The aqueous phase is applied to a column of Dowex 1X2 (formate form, 50–100 mesh). Impurities are washed out with a linear gradient of 2 litres water and 2 litres 1.5 M ammonium formate solution. By subsequent elution with 1.5 M sodium chloride (pH 3), the product is eluted, the combined fractions are desalted over charcoal and eluted with a mixture of ethanol:water:ammonia (50:50:1). The aqueous phase is concentrated and, after passing through Dowex 50 (Na form), is lyophilised.

There are obtained 3.2 g. 6-(4-methyl-benzylamino)-purine-ribofuranoside-3′,5′-cyclophosphate sodium salt, which is 75% of theory, referred to the amount of 6-chloropurine-riboside - 3′,5′ - cyclophosphate used. The product has a purity of about 95%.

For the complete removal of the impurities, the 3.2 g. of product are dissolved in a little water and applied to three silica gel thick layer plates (50 cm. long, 20 cm. high; layer thickness 2.5 mm.) and developed with isopropanol:ammonia:water (7:1:1) (pH 10) within a period of 10 hours. After the removal of colloidally dissolved silicon dioxide on charcoal, there are obtained 1.9 g. of pure sodium salt. The lyophilised substance still contains 4.98% water.

Analysis.—$C_{18}H_{19}O_6N_5PNa$ (M.W. 455.37). Calcd. (percent): N, 14.65; P, 6.50; Na, 4.83. Found (percent): N, 13.80; P, 6.11; Na, 5.3.

EXAMPLE 4

6-methoxy-purine-ribofuranoside-3′,5′-cyclophosphate 5 g. crude 6-chloropurine-riboside-3′,5′-cyclophosphate in the form of the free acid (70% purity) are dissolved in 150 ml. methanol and adjusted to pH 10–11 with methanolic sodium hydroxide solution (3 g. sodium hydroxide per 100 ml. methanol). After 30 minutes, the solution is neutralised to pH 7 with acetic acid and distilled to dryness and the residue is dissolved in 100 ml. water and chromatographed through a column of 300 ml. Dowex 1X2 (50–100 mesh, formate form). After elution with a linear gradient of 2 litres distilled water against 1.5 M ammonium formate solution, further elution was carried out with 3–4 litres 1.5 M ammonium formate solution. The fraction containing the desired 6-methoxy-purine - riboside - 3′,5′ - cyclophosphate ($R_f$ in solvent A=0.56) is chromatographed through a column of charcoal (100 ml.). After a pre-washing with water, the column is subsequently eluted with isopropanol:water:ammona (50:50:1) and the eluate concentrated to about 50 ml. After passing through Dowex 50 (H+ form), the solution is lyophilised. There are obtained 3.0 g. (77% of theory) 6-methoxy-purine-ribofuranoside-3′,5′-cyclophosphate.

Analysis.—$C_{11}H_{13}O_7N_4P$ (M.W. 343.22). Calcd. (percent): N, 15.70; P, 8.41. Found (percent): N, 15.1; P, 8.55.

According to the analysis, the compound still contains 3.3% water.

EXAMPLES 5–16

The compounds set out in the following Table III are prepared in a manner analogous to that described in the above-given Examples 2–4. In this table, Pu stands for purine-ribofuranoside and MP for cyclophosphate.

TABLE III

| Example No. | Compound | Z |
|---|---|---|
| 5 | 6-pentylamino-Pu-3′:5′-MP | $NR_3R_4$; $R_3$=Pentyl, $R_2$=H. |
| 6 | 6-dimethylamino-Pu-3′:5′-MP | $NR_3R_4$; $R_3R_2$=Methyl. |
| 7 | 6-(allylamino)-Pu-3′:5′-MP | $NR_3R_4$; $R_3$=Allyl, $R_2$=H. |
| 8 | 6-(benzylamino)-Pu-3′:5′-MP | $NR_3R_4$; $R_3$=Benzyl, $R_2$=H. |
| 9 | 6-(2′-chlorobenzylamino)-Pu-3′:5′-MP | $NR_3R_4$; $R_3$=2′-chlorobenzyl, $R_4$=H. |
| 10 | 6-(2′-methylbenzylamino)-Pu-3′:5′-MP | $NR_3R_4$; $R_3$=2′-methylbenzyl, $R_4$=H. |
| 11 | 6-(3′,4′-dimethoxyphenylethylamino)-Pu-3′:5′-MP | $NR_3R_4$; $R_3$=3′,4′-dimethoxyphenylethyl, $R_4$=H. |
| 12 | 6-(2-phenylethylamino)-Pu-3′:5′-MP | $NR_3R_4$; $R_3$=Phenylethyl-(2); $R_4$=H. |
| 13 | 6-(1-phenylethylamino)-Pu-3′:5′-MP | $NR_3R_4$; $R_3$=Phenylethyl-(1); $R_4$=H. |
| 14 | 6-(1-phenylbutyl-(3)-amino)-Pu-3′:5′-MP | $NR_3R_4$; $R_3$=1-phenyl butyl-(3); $R_4$=H. |
| 15 | 6-(piperidino)-Pu-3′:5′-MP | $NR_3R_4$; $R_3+R_4$=Piperidino. |
| 16 | 6-(ephedrino)-Pu-3′:5′-MP | $NR_3R_4$; $R_3$=3-phenyl-3-hydroxypropyl-(2); $R_4$=$CH_3$. |
| 17 | 6-phenylamino-Pu-3′:5′-MP | $NR_3R_4$; $R_3$=Phenyl; $R_4$=H. |
| 18 | 6-benzyloxy-Pu-3′:5′-MP | Benzyloxy. |
| 19 | 6-piperazino-Pu-3′:5′-MP | $NR_3R_4$; $R_3+R_4$=Heterocyclic ring. |
| 20 | 6-octyloxy-Pu-3′:5′-MP | Octyloxy. |
| 21 | 6-(1-methyl-2-phenylethylamino)-Pu-3′:5′-MP | $NR_3R_4$; $R_3$=Methylphenylethyl, $R_4$=H. |

In the following Tables IV and V are given the characterising data of the compounds of Examples 2–21 with regard to the ultra-violet spectra and the electrophoretic behaviour:

TABLE IV

| Compound | Neutral 005 M Phosphate | | Acidic 0.1 N HCl | | Alkaline 0.1 N NaOH | |
|---|---|---|---|---|---|---|
| | Max. | Min. | Max. | Min. | Max. | Min. |
| 6-piperidino-Pu-3′:5′-MP | 279.5 | 244 | 278 | 238 | 281.5 | 246 |
| 6-morpholino-Pu-3′:5′-MP | 277 | 235 | 273.5 | 235 | 278 | 238.5 |
| 6-ephedrino-Pu-3′:5′-MP | 277 | 246 | 273 | 241 | 279 | 245 |
| 6-allylamino-Pu-3′:5′-MP | 266 | 230 | 262.5 | 230 | 267 | 233 |
| 6-pentylamino-Pu-3′:5′-MP | 266.5 | 231 | 262 | 229 | 267.5 | 234 |
| 6-benzylamino-Pu-3′:5′-MP | 266 | 236 | 265 | 235 | 268 | 238 |
| 6-(2′-chlorobenzylamino)-Pu-3′:5′-MP | 267.5 | 232.5 | 264 | 232.5 | 268.5 | 235 |
| 6-(3′,4′-dimethoxyphenylethylamino)Pu-3′:5′-MP | 268 | 235 | 264 | 234 | 269 | 240 |
| 6-(4′-methylbenzylamino)-Pu-3′:5′-MP | 267 | 237 | 266 | 236 | 269 | 240 |
| 6-(2-phenylethylamino)-Pu-3′:5′-MP | 268 | 232.5 | 264 | 232 | 268 | 234.5 |
| 6-(1-phenylethylamino)-Pu-3′:5′-MP | 267.5 | 241 | 166 | 234 | 270 | 238 |
| 6-(1-phenylbutylamino(3))-Pu-3′:5′-MP | 269 | 237 | 266 | 236 | 270 | 240 |
| 6-methoxy-Pu-3′:5′-MP | 247 | 220 | 249 | 220 | 250 | 222 |
| 6-dimethylamino-Pu-3′:5′-MP | 274 | 235 | 268 | 231.5 | 275 | 237.5 |
| 6-(2′-methylbenzylamino)-Pu-3′:5′-MP | 166.5 | 231.5 | 264 | 232.5 | 267.5 | 235 |
| 6-phenylamino-Pu-3′:5′-MP | 287.5 | 243 | 273 | 237 | 288 | 243 |
| 6-benzyloxy-Pu-3′:5′-MP | 250 | 225 | 250 | 244.5 | 250 | 230 |
| 6-piperazine-Pu-3′:5′-MP | 286 | 240 | 282 | 234.5 | 286 | 240 |
| 6-octyloxy-Pu-3′:5′-MP | 251 | 224 | 251 | 223.5 | 251 | 223 |
| 6-(1-methyl-2-phenylethylamino)-Pu-3′:5′-MP | 270 | 233.5 | 265 | 232 | 271 | 234.5 |

TABLE V

| Compound | UV-quotient[1] | | | | | | Elektro. phor. MOB rel. to A-3':5'-MP[2] | Chromatography in LSMA[3] |
|---|---|---|---|---|---|---|---|---|
| | Neutral | | | Acidic | | | | |
| | 250/260 | 280/260 | 290/260 | 250/260 | 280/260 | 290/260 | | |
| 6-piperidino-Pu-3':5'-MP | 0.46 | 2.17 | 1.88 | 0.53 | 1.22 | 0.82 | 0.94 | 0.74 |
| 6-morpholino-Pu-3':5'-MP | 0.46 | 1.93 | 1.27 | 0.52 | 1.35 | 0.91 | 0.97 | 0.64 |
| 6-ephedrino-Pu-3':5'-MP | 0.49 | 1.94 | 1.61 | 0.57 | 1.28 | 0.89 | 0.84 | 0.78 |
| 6-allylamino-Pu-3':5'-MP | 0.58 | 0.67 | 0.21 | 0.65 | 0.47 | 0.13 | 0.95 | 0.67 |
| 6-pentylamino-Pu-3':5'-MP | 0.56 | 0.79 | 0.32 | 0.66 | 0.45 | 0.14 | 0.91 | 0.80 |
| 6-benzylamino-Pu-3':5'-MP | 0.58 | 0.84 | 0.33 | 0.64 | 0.70 | 0.24 | 0.68 | 0.73 |
| 6-(2'-chlorobenzylamino)-Pu-3':5'-MP | 0.56 | 0.79 | 0.27 | 0.63 | 0.68 | 0.24 | 0.73 | 0.79 |
| 6-(3',4'-dimethoxyphenylethylamino)-Pu-3':5'-MP | 0.55 | 0.93 | 0.43 | 0.67 | 0.61 | 0.25 | 0.87 | 0.81 |
| 6-(4'-methylbenzylamino)-Pu-3':5'-MP | 0.57 | 0.87 | 0.34 | 0.65 | 0.72 | 0.26 | 0.81 | 0.77 |
| 6-(2-phenylethylamino)-Pu-3':5'-MP | 0.56 | 0.83 | 0.33 | 0.63 | 0.64 | 0.22 | 0.83 | 0.78 |
| 6-(1-phenylethylamino)-Pu-3':5'-MP | 0.57 | 0.88 | 0.35 | 0.63 | 0.74 | 0.25 | 0.86 | 0.80 |
| 6-(1-phenylbutylamino-(3))-Pu-3':5'-MP | 0.55 | 0.99 | 0.48 | 0.65 | 0.70 | 0.30 | 0.80 | 0.86 |
| 6-methoxy-Pu-3':5'-MP | 1.6 | 0.06 | 0.03 | 1.41 | 0.059 | 0.03 | 1.15 | 0.56 |
| 6-dimethylamino-Pu-3':5'-MP | 0.47 | 1.44 | 0.87 | 0.59 | 0.82 | 0.37 | 1.1 | 0.61 |
| 6-(2'-methylbenzylamino)-Pu-3':5'-MP | 0.57 | 0.77 | 0.28 | 0.64 | 0.65 | 0.18 | 0.85 | 0.76 |
| 6-phenylamino-Pu-3':5'-MP | 0.61 | 22.2 | 2.48 | 0.64 | 1.19 | 0.93 | 0.70 | 0.73 |
| 6-benzyloxy-Pu-3':5'-MP | 1.38 | 0.10 | 0.07 | 1.27 | 0.10 | 0.05 | 0.82 | 0.80 |
| 6-Piperazino-Pu-3':5'-MP | 0.602 | 2.38 | 2.52 | 0.545 | 1.74 | 1.49 | 0.87 | 0.23 |
| 6-octyloxy-Pu-3':5'-MP | 1.68 | 0.096 | 0.085 | 1.29 | 0.03 | 0.03 | 0.71 | 0.85 |
| 6-(1-methyl-2-phenylethylamino)-Pu-3':5'-MP | 0.52 | 1.00 | 0.46 | 0.62 | 0.73 | 0.28 | | |

[1] Spectra recorded with a Beckmann DK IIA apparatus.
[2] Electrophoresis on Whatman Paper No. 3MM, 13 cm. wide, 1,200 volts, 45 minutes; buffer 0.05M triethyl ammonium bicarbonate, pH 7.5. Chromatography on Schleicher & Schull Paper No. 2033b, descending 15 hours; eluent isopropanol:ammonia: water 7:1:2 (LSMA).
[3] LSMA=isopropanol/ammonia/water (7:1:2).

EXAMPLE 22

8-bromoadenosine-3',5'-cyclophosphate 20 g. adenosine-3',5'-cyclophosphate in the form of the free acid are dissolved in 300 ml. 0.2 N sodium hydroxide solution and to this 24 ml. bromine are added dropwise in the course of 30 minutes. The solution is subsequently shaken or stirred overnight. According to the paper chromatogram using ethanol:1 M ammonium acetate (5:2), the reaction is almost quantitative. The excess bromine is stripped off in a vacuum and 8-bromoadenosine-3',5'-cyclophosphate crystallises out. After drying, the yield is 18 g. of product in a chromatographically pure state. The filtrate gives, after concentration and precipitation with alcohol, a further 3 g. of crude product which is still slightly contaminated with adenosine-3',5'-cyclophosphate. The final yield is between 80 and 85% of theory.

In the case of another method of working up, the reaction product, after neutralisation with ammonia, is applied to a Dowex 1X2 column (in the form of formate, 350 ml.) and the unreacted adenosine - 3',5' - cyclophosphate is removed with 0.2 N formic acid. The elution of the 8-bromoadenosine - 3',5' - cyclophosphate is subsequently carried out with 2 N formic acid. Upon concentrating the 2 N formic acid solution, the desired product crystallises out. It has a melting point of 221° C. (uncorrected).

*Analysis.*—$C_{10}H_{11}O_6N_5PBr$ (M.W. 408.13). Calcd. (percent): C, 29.43; H, 2.71; P, 7.56; N, 17.10; Br, 19.58. Found (percent): C, 29.14; H, 2.67; P, 7.64; N, 16.47; Br, 19.14.

EXAMPLE 23

8-bromo-d-adenosine-3',5'-cyclophosphate 50 mg. (0.13 mmole) desoxy-adenosine - 3',5' - cyclophosphate are kept for 15 hours at ambient temperature with 2 ml. 0.2 N sodium hydroxide solution, the pH value of which had been adjusted to 7 with bromine. After evaporation in a vacuum and taking up the residue in water, the material is then chromatographed on Whatman Paper No. 3MM using isopropanol:ammonia:water (7:1:2) (solvent A) as eluent. The upper band is eluted with water and lyophilised. There are obtained 40 mg. 3 - bromo-d-adenosine - 3',5' - cyclophosphate (60% of theory) in pure form.

EXAMPLE 24

8-bromoinosine-3',5'-cyclophosphate 10 g. inosine - 3',5' - cyclophosphate (free acid) are dissolved in 150 ml. 0.2 N sodium hydroxide solution and, while stirring, 8 ml. bromine are added thereto within the course of 30 minutes, whereafter the reaction mixture is further stirred overnight. After stripping off the bromine in a vacuum, the solution is evaporated until the mixture is just yellow. After neutralisation, it is applied to a column of Dowex 1X2 in the formate form (300 ml.). The removal of impurities takes place by elution with 0.2 N formic acid. The 8-bromoinosine-3',5'-cyclophosphate is eluted with 2 N formic acid and the eluate is evaporated to about 20 ml. in a rotary evaporator and mixed with 20 times its volume of acetone, whereby the desired product crystallises out in chromatographically pure form. The 8-bromoinosine - 3',5' - cyclophosphate thus obtained has a melting point of 202° C. (uncorrected).

The yield is 6.8 g., which is about 55% of the theoretical yield.

*Analysis.*—$C_{10}H_{10}O_7N_4P$ (M.W. 409.11). Calcd. (percent): C, 29.36; H, 2.46; N, 13.67; P, 7.57; Br, 19.53. Found (percent): C, 29.26; H, 2.75; N, 13.33; P, 7.41; Br, 18.97.

EXAMPLE 25

8-mercapto-adenosine-3',5'-cyclophosphate 2 g. 8-bromoadenosine - 3',5' - cyclophosphate are suspended in 100 ml. ethanol, 1.2 g. thiourea are added thereto and, by the addition of a few drops of ammonium hydroxide solution, the solution is homogenised. Subsequently, the reaction mixture is boiled under reflux for 23 hours. After removal of the ethanol, the residue is dissolved in a little water and applied to a silica gel thick layer plate (2 mm.). The plate is developed twice with solvent A. The band with $\lambda_{max}$=298, pH 7, is eluted with 4.30 ml. water, the solution is evaporated to dryness in a vacuum, taken up with 3 ml. water, filtered and precipitated with acetone. There are obtained 1.2 g. (65% of theory) 8-mercapto-adenosine - 3',5' - cyclophosphate ammonium salt.

EXAMPLE 26

8-bromoguanosine-3',5'-cyclophosphate 250 mg. guanosine - 3',5' - cyclophosphate are dissolved in 4 ml. 0.2 N sodium hydroxide solution and mixed with 1 ml. bromine. After a reaction period of 16 hours at ambient temperature, the reaction, determined spectrophotometrically, is about 85%. After evaporation of the solvent, the material is applied to Whatman Paper No. 3MM and developed with solvent A. After elution of the main band with water and lyophilisation, there are obtained 100 mg. 8-bromoguanosine - 3',5' - cyclophosphate in pure form.

EXAMPLE 27

8-hydroxyadenosine-3',5'-cyclophosphate 4 g. 8-bromoadenosine - 3',5' - cyclophosphate in 80 ml. dimethyl sulphoxide are reacted within a period of 1 hour, at ambient temperature, with 56 ml. sodium benzylate solution (concentration 2 g./70 ml.). The paper chromatogram of the reaction mixture shows a strong spot (85% of the total ultraviolet absorbing material) with the $R_f$ value of 0.80; after acidification with formic acid to pH 2 and passing through 120 ml. activated charcoal, the material is applied to a column of Dowex 1X2 in the formate form. The impurities are eluted with 0.15 N formic acid and the desired product with 0.5 N formic acid. After concentration of the eluate in a vacuum, the substance crystallises out upon standing overnight in a refrigerator; from the mother liquor, there is obtained a further fraction by precipitation with ethanol/acetone. There are thus obtained 2 g. (58% of theory) 8-hydroxyadenosine - 3',5' - cyclophosphate, which is chromatographically uniform but only has an $R_f$ value of about 0.20.

*Analysis.*—$C_{10}H_{12}N_5O_7P \cdot \frac{1}{2}H_2O$ (M.W. 354.23). Calcd. (percent): C, 33.90; H, 3.69; N, 19.77; P, 8.72. Found (percent): C, 33.97; H, 3.91; N, 18.76; P, 8.4.

EXAMPLE 28

8-phenylethylamino-adenosine-3',5'-cyclophosphate 4.5 g. 8-bromoadenosine-3',5'-cyclophosphate are boiled for 7 hours with 15.5 ml. 2-phenylethylamine in 50 ml. ethanol and 10 ml. dimethyl sulphoxide. After cooling, the reaction mixture is concentrated in a rotary evaporator, diluted with 200 ml. water and extracted once with 50 ml. ether. The aqueous solution is subsequently applied to a column of Dowex 1X2 in formate form (60 ml. column content) and the small amounts of impurities are washed out with 0.15 N formic acid. The 8-(2-phenylethylamino)-adenosine-3',5'-cyclophosphate thereby partially crystallises out and is eluted from the column with a dilute aqueous solution of ammonia. After further elution with dilute formic acid, the combined solutions are concentrated in a vacuum. The product thereby crystallises out in pure form. There are obtained 4.6 g. (89% of theory) 8-(2-phenylethylamino)-adenosine-3',5'-cyclophosphate monohydrate.

*Analysis.*—$C_{18}H_{21}N_6O_6P \cdot H_2O$ (M.W. 466.41). Calcd. (percent): C, 46.35; H, 4.96; N, 18.09; P, 6.63. Found (percent): C, 46.93; H, 4.96; N, 17.63; P, 6.2.

EXAMPLE 29

8-(benzylamino)-inosine-3',5'-cyclophosphate 4 g. 8-bromoinosine-3',5'-cyclophosphate are reacted with a twentyfold amount of benzylamine (21 ml.) in 50 ml. ethanol and 10 ml. dimethyl sulphoxide. After 28 hours boiling under reflux, the reaction is practically completed. The ethanol is distilled off, the dimethyl sulphoxide solution is diluted to about 150 ml. and extracted once with ether. The aqueous solution is applied to a column of Dowex 1X2 in the formate form (60 ml.), pre-washed with 0.5 N formic acid and then the 8-benzylamino-inosine-3',5'-cyclophosphate is eluted with 1 N formic acid. The eluate is concentrated to about 50 ml. and the solution precipitated with acetone. There are thus obtained 4 g. (90% of theory) of the benzylamino compound.

*Analysis.*—$C_{17}H_{18}O_7N_5P \cdot H_2O$ (M.W. 453.36). Calcd. (percent): C, 45.04; H, 4.44; N, 15.45; P, 6.83. Found (percent): C, 44.82; H, 4.49; N, 15.30; P, 6.51.

EXAMPLE 30

8-bromoinosine-3',5'-cyclophosphate 5.9 g. 8-bromoadenosine-3',5'-cyclophosphate (free acid) (14.4 mole) are dissolved in 250 ml. ice water, using a magnetic stirrer and adding a concentrated aqueous solution of ammonia (pH=7). There is then added a mixture of 50 g. (720 mmole) sodium nitrite and 43.2 g. acetic acid (720 mmole) and the solution maintained at 4° C. for 24 hours. For the destruction of any nitrile still present, 43.2 g. (720 mmole) urea are added and the reaction mixture left to stand for a further 24 hours at ambient temperature, the pH being adjusted to 3–4 with concentrated hydrochloric acid, if necessary. The solution is subsequently applied to a column of charcoal (100 ml. content), washed with water and the product eluted with ethanol:water:ammonia (100:100:1). After working up in the manner described in Example 3, there are obtained 3.77 g. (77% of theory) of pure 8-bromoinosine-3',5'-cyclophosphate.

EXAMPLES 31–47

The compounds set out in the following table are prepared in the manner described in the preceding examples. Insofar as X represents an —$NR_1R_2$ group, the process of Example 7 or 8 is used. In this table, A stands for adenosine, I stands for inosine and MP for cyclophosphate:

TABLE VI

| Ex. No. | Compound | X | Z | B | Y |
|---|---|---|---|---|---|
| 31 | 8-(2'-chlorobenzyl-amino)-A-3':5'-MP. | $NR_1R_2$; $R_1$=2'-chlorobenzyl; $R_2$=H. | $NH_2$ | H | OH |
| 32 | 8-(2'-methylbenzyl-amino)-A-3':5'-MP. | $NR_1R_2$; $R_1$=2'-methylbenzyl; $R_2$=H. | $NH_2$ | H | OH |
| 33 | 8-(4'-methylbenzyl-amino)-A-3':5'-MP. | $NR_1R_2$; $R_1$=4'-methylbenzyl-amino; $R_2$=H. | $NH_2$ | H | OH |
| 34 | 8-(3',4'dimethoxy-phenylethylamino)-A-3':5'-MP. | $NR_1R_2$; $R_1$=3',4'-dimethoxyphenyl-ethyl; $R_2$=H. | $NH_2$ | H | OH |
| 35 | 8-(3',4'-dioxymethyl-enebenzylamino)-A-3':5'-MP. | $NR_1R_2$; $R_1$=Dioxy-methylenebenzyl; $R_2$=H. | $NH_2$ | H | OH |
| 36 | 8-amylamino-A-3':5'-MP. | $NR_1R_2$; $R_1$=Amyl; $R_2$=H. | $NH_2$ | H | OH |
| 37 | 8-allylamino-A-3':5'-MP. | $NR_1R_2$; $R_1$=Allyl; $R_2$=H. | $NH_2$ | H | OH |
| 38 | 8-piperidino-A-3':5'-MP. | $NR_1R_2$; $R_1+R_2$=Heterocyclic ring. | $NH_2$ | H | OH |
| 39 | 8-morpholino-A-3':5'-MP. | $R_1+R_2$=Heterocylic ring with O. | $NH_2$ | H | OH |
| 40 | 8-adrenalino-A-3':5'-MP. | $NR_1R_2$; $R_1$=2(3',4'-dihydroxyphenyl)-2 hydroxyethyl-(1); $R_2$=$CH_3$. | $NH_2$ | H | OH |
| 41 | 8-ephedrino-3':5'-A-MP. | $NR_1R_2$; $R_1$=3-(phenyl)-3-hydroxypropyl-(2); $R_2$=$CH_3$. | $NH_2$ | H | OH |
| 42 | 8-(4-phenylbutyl-(2)-amino)-A-3':5'-MP. | $NR_1R_2$; $R_1$=4-phenyl-butyl-(2); $R_2$=H. | $NH_2$ | H | OH |
| 43 | 8-hydrazino-A-3':5'-MP. | $NR_1R_2$; $R_1$=$NH_2$; $R_2$=H. | $NH_2$ | H | OH |
| 44 | 8-(benzylamino)-A-3':5'-MP. | $NR_1R_2$; $R_1$=Benzyl; $R_2$=H. | $NH_2$ | H | OH |
| 45 | 8-methylmercapto-A-3':5'-MP. | $CH_3S$ | $NH_2$ | H | OH |
| 46 | 8-(4'-methylbenzyl-amino)I-3':5'-MP. | $NR_1R_2$; $R_1$=4' methylbenzyl; $R_2$=H. | OH | H | OH |
| 47 | 8-benzyloxy-A-3':5'-MP. | Benzyloxy | $NH_2$ | H | OH |

In the following Tables VII and VIII are given the characteristic data of the compounds of Examples 22–47 with regard to the ultra-violet spectra and the electrophoretic behaviour:

TABLE VII

| Compound | Neutral 0.05 M phos. | | Acidic 0.1 N HCl | | Alkaline 0.1 N NaOH | |
|---|---|---|---|---|---|---|
| | Max. | Min. | Max. | Min. | Max. | Min. |
| 8-bromo-A-3':5'-MP | 264 | 230 | 262.5 | 229.5 | 264.5 | 232.5 |
| 8-(2'-chlorobenzylamino)-A-3':5'-MP | 274.5 | 237 | 276.5 | 241 | 275 | 238 |
| 8-(2'-methylbenzylamino)-A-3':5'-MP | 274 | 236 | 276 | 240 | 275 | 238.5 |
| 8-(4'-methylbenzylamino)-A-3':5'-MP | 274 | 237 | 276 | 240.5 | 275 | 239 |
| 8-(benzylamino)-A-3':5'-MP | 275 | 236.5 | 276.5 | 240 | 276.5 | 238.5 |
| 8-(3',4'-dimethoxyphenyl-ethylamino)-A-3':5'-MP | 277 | 244.5 | 277.5 | 245.5 | 277.5 | 245 |
| 8-(3',4'-dioxymethylene-benzylamino)-A-3':5'-MP | 278 | 243 | 278.5 | 246 | 278.5 | 245 |
| 8-amylamino-A-3':5'-MP | 275 | 236 | 274 | 239 | 277 | 238 |
| 8-allylamino-A-3':5'-MP | 275 | 236 | 276 | 239 | 275 | 238.5 |
| 8-piperidino-A-3':5'-MP | 273.5 | 241.5 | 280 | 245 | 275 | 241.5 |
| 8-morpholino-A-3':5 -MP | 271 | 238 | 276 | 241 | 271.5 | 240 |
| 8-(2'-phenylethylamino)-A-3':5'-MP | 275 | 236 | 275 | 240.5 | 276 | 238 |
| 8-(Adrenalino)-A-3':5'-MP | 259 | 234.5 | 259 | 235 | 249 | 230 |
| 8-(Ephedrino)-A-3':5'-MP | 258 | 266.5 | 256 | 228 | 258.5 | 230 |
| 8-(4-phenylbutyl(2)-amino)-A-3':5'-MP | 276.5 | 236.5 | 275 | 240 | 276.5 | 237 |
| 8-hydrazino-A-3':5'-MP | 265 | 243 | 263 | 242 | 265 | 244.5 |
| 8-bromo-I-3':5'-MP | 253 | 222.5 | 253 | 222.5 | 259 | 231 |
| 8-benzylamino-I-3':5'-MP | 26.5 | 235 | 256 | 232 | 266 | 235 |
| 8-bromo-d-A-3':5'-MP | 264 | 230 | 262.5 | 230 | 264.5 | 232 |
| 8-mercapto-A-3':5'-MP | 297, 231 | 255 | 308, 243, 222 | 262, 235, 212 | 295, 230 | 250 |
| 8-bromo-G-3':5'-MP | 261 | 225 | 261 | 228 | 270 | 235 |
| 8-methylmercapto-A-3':5'-MP | 278 | 244 | 280 | 240 | 278.5 | 244 |
| 8-(4'-methylbenzylamino)-I-3':5'-MP | 266 | 236 | 257 | 233.5 | 266 | 235 |
| 8-benzyloxy-A-3':5'-MP | 258 | 230 | 260.5 | 223.5 | 258.5 | 230 |
| 8-hydroxy-A-3':5'-MP | 268 | 231 | 263 | 235 | 278 | 236 |

TABLE VIII

| Compound | UV-quotients [1] | | | | | | Elektrophoret movement rel. to A-3':5'MP [2] | Chromatograph movement in LSMA |
|---|---|---|---|---|---|---|---|---|
| | Neutral | | | Acidic | | | | |
| | 250/260 | 280/260 | 290/260 | 250/260 | 280/260 | 290/260 | | |
| 8-bromo-A-3':5'-MP | 0.66 | 0.47 | 0.11 | 0.65 | 0.45 | 0.14 | 0.86 | 0.51 |
| 8-(2'-chlorobenzylamino)-A-3':5'-MP | 0.50 | 1.42 | 0.73 | 0.47 | 1.80 | 1.40 | 0.86 | 0.69 |
| 8-(2'-methylbenzylamino)-A-3':5'-MP | 0.48 | 1.38 | 0.69 | 0.50 | 1.65 | 1.28 | 0.67 | 0.62 |
| 8-(4'-methylbenzylamino)-A-3':5'-MP | 0.54 | 1.35 | 0.71 | 0.50 | 1.67 | 1.30 | 0.70 | 0.66 |
| 8-(benzylamino)-A-3':5'-MP | 0.51 | 1.37 | 0.72 | 0.48 | 1.73 | 1.36 | 0.76 | 0.61 |
| 8-(3',4'-dimethoxyphenyl-ethylamino)-A-3':5'-MP | 0.51 | 1.65 | 0.92 | 0.55 | 1.78 | 1.30 | 0.47 | 0.56 |
| 8-(3',4'-dioxymethylenebenzylamino)-A-3':5'-MP | 0.53 | 1.63 | 1.0 | 0.58 | 1.68 | 1.11 | 0.61 | 0.59 |
| 8-amylamino-A-3':5'-MP | 0.51 | 1.44 | 0.83 | 0.50 | 1.25 | 0.98 | 0.73 | 0.76 |
| 8-allylamino-A-3':5'-MP | 0.50 | 1.36 | 0.67 | 0.51 | 1.53 | 1.16 | 0.86 | 0.56 |
| 8-piperidino-A-3':5'-MP | 0.53 | 1.33 | 0.70 | 0.45 | 2.11 | 1.79 | 0.74 | 0.66 |
| 8-morpholino-A-3':5'-MP | 0.53 | 1.0 | 0.36 | 0.47 | 1.61 | 1.15 | 0.77 | 0.54 |
| 8-(2'-phenylethylamino)-A-3':5'-MP | 0.53 | 1.38 | 0.80 | 0.57 | 1.39 | 0.80 | 0.66 | 0.62 |
| 8-(adrenalino)-A-3':5'-MP | 0.85 | 0.45 | 0.11 | 0.79 | 0.70 | 0.41 | 1.0 | 0.15 |
| 8-(ephedrino)-A-3':5'-MP | 0.82 | 0.22 | 0.05 | 0.90 | 0.27 | 0.10 | 0.91 | 0.42 |
| 8-(4-phenylbutyl(2)amino)-A-3':5'-MP | 0.51 | 1.44 | 0.89 | 0.54 | 1.36 | 1.06 | 0.73 | 0.80 |
| 8-hydrazino-A-3':5'-MP | 0.83 | 0.78 | 0.47 | 0.79 | 0.74 | 0.42 | 0.85 | 0.26 |
| 8-bromo-I-3':5'-MP | 1.14 | 0.34 | 0.12 | 1.16 | 0.33 | 0.12 | 1.40 | 0.35 |
| 8-benzylamino-I-3':5'-MP | 0.57 | 0.65 | 0.52 | 0.98 | 0.35 | 0.23 | 0.90 | 0.54 |
| 8-bromo-d-A-3':5'-MP | 0.67 | 0.47 | 0.10 | 0.65 | 0.46 | 0.14 | 0.90 | 0.51 |
| 8-mercapto-A-3':5'-MP | 1.0 | 3.19 | 4.60 | 22.6 | 2.6 | 4.26 | 1.35 | 0.14 |
| 8-bromo-C-3':5'-MP | 0.79 | 0.73 | 0.40 | 0.85 | 0.71 | 0.42 | 0.90 | 0.24 |
| 8-methylmercapto-A-3':5'-MP | 0.53 | 1.87 | 1.26 | 0.53 | 1.90 | 1.58 | 0.90 | 0.53 |
| 8-(4'-methylbenzylamino)-I-3':5'-MP | 0.59 | 0.68 | 0.53 | 0.93 | 0.39 | 0.25 | 0.82 | 0.59 |
| 8-benzyloxy-A-3':5'-MP | 0.85 | 0.18 | 0.03 | 0.69 | 0.61 | 0.40 | 0.76 | 0.68 |
| 8-hydroxy-A-3':5'-MP | 0.84 | 0.63 | 0.14 | 0.66 | 0.88 | 0.82 | 1.12 | 0.28 |

[1] Spectra recorded with a Beckmann DK IIA apparatus.
[2] Electrophoresis on Whatman Paper No. 3MM, 13 cm. wide, 1,200 volts, 45 minutes; buffer 0.05 M triethyl ammonium bicarbonate, pH 7.5.

What we claim is:
1. Compounds of the general formula:

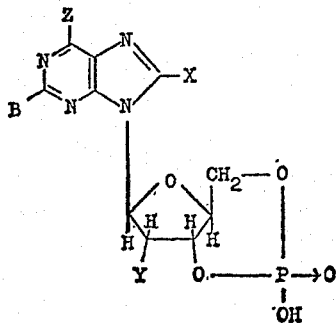

wherein B is hydrogen, hydroxyl, or amino; Z is halogen, alkoxy of from 1 to 8 carbon atoms, aryloxy or aralkyloxy of up to 7 carbon atoms; a mono- or disubstituted amino group or hydrogen, hydroxyl or unsubstituted amino; Y is hydroxyl or hydrogen; and X is hydrogen or halogen, hydroxyl, aryloxy or aralkyloxy of up to 7 carbon atoms, sulphhydryl, alkylmercapto of up to 8 carbon atoms or an unsubstituted or substituted amino group; and the pharmacologically acceptable salts thereof.

2. Compounds according to claim 1, wherein X is $-NR_1R_2$ in which $R_1$ and $R_2$, which can be the same or different, are hydrogen atoms, amino groups, saturated or unsaturated, straight or branched chain aliphatic hydrocarbon radicals or saturated or unsaturated cycloaliphatic or araliphatic radicals or aryl radicals, and wherein $R_1$ and $R_2$ contain up to 8 carbon atoms, the aromatic rings of these substituents optionally contaning halogen atoms, hydroxyl groups, alkoxy and/or dioxyalkylene radicals and the alkyl radicals containing up to 8 carbon atoms and optionally containing hydroxyl groups or $R_1$ and $R_2$, optionally together with a further oxygen or nitrogen atom, can be joined to form a saturated or unsaturated heterocyclic ring of 6 ring atoms.

3. Compounds as claimed in claim 1 wherein Z is $-NR_3R_4$ in which $R_3$ and $R_4$, which can be the same or different, are saturated or unsaturated, straight or branched chain aliphatic hydrocarbon radicals or aryl or aralkyl radicals containing up to 18 carbon atoms and $R_3$ can also be hydrogen the aromatic rings of which can be substituted by halogen atoms, alkyl radicals or alkoxy radicals and the alkyl radicals of which contain up to 8 carbon atoms and can be substituted by hydroxyl groups, or $R_3$ and $R_4$ together, possibly with a further oxygen or nitrogen atom, can form a heterocyclic ring.

4. Compound as claimed in claim 1 designated 6-chloropurine-ribofuranoside-3',5'-cyclophosphate.

5. Compound as claimed in claim 1 designated 6-benzylamino-purine-ribofuranoside-3',5'-cyclophosphate.

6. Compound as claimed in claim 1 designated 6-(2'-methyl-benzylamino) - purine-ribofuranoside-3',5'-cyclophosphate.

7. Compound as claimed in claim 1 designated 8-bromo-d-adenosine-3',5'-cyclophosphate.

8. Compound as claimed in claim 1 designated 8-bromoinosine-3',5-cyclophosphate.

9. Compound as claimed in claim 1 designated 8-mercapto-adenosine-3',5'-cyclophosphate.

10. Compound as claimed in claim 1 designated 8-bromoguanosine-3',5'-cyclophosphate.

11. Compound as claimed in claim 1 designated 8-benzylamino-inosine-3',5'-cyclophosphate.

12. Compound as claimed in claim 1 designated 8-methylmercapto-adenosine-3',5'-cyclophosphate.

13. Process for the preparation of compounds of the general formula given in claim 1, wherein a cyclophosphate of the general formula:

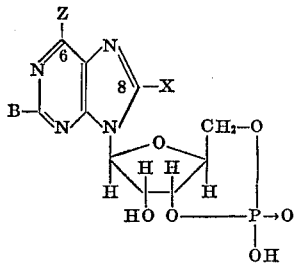

in which Z is hydroxy; X is hydrogen, and B is hydrogen, hydroxyl, or amino; is halogenated in the 6- or 8-position and the 6- or 8-halo compound thereby obtained is optionally converted into the corresponding compound wherein Z is hydrogen, hydroxy, an unsubstituted amino, an ether group, a mono or disubstituted amino group or into a corresponding compound wherein X is hydrogen, hydroxy, unsubstituted or substituted amino, an ether group or thioether group, sulphhydryl respectively.

14. Process according to claim 13, wherein, for the preparation of the 6-substituted compounds, the cyclophosphate is first reacted with an acylating agent in the presence of a base, excess acylating agent and base are then removed and the acylation product is reacted with a phosphorus oxyhalide at a temperature between 0° C. and reflux temperature.

15. Process according to claim 14, wherein the base is a nitrogen-containing organic base.

16. Process according to claim 14 wherein the acylating agent is an acyl chloride or an acyl anhydride.

17. Process according to claim 14 wherein the acylating agent is acetyl chloride, acetic anhydride or benzoyl chloride.

18. Process according to claim 14 wherein phosphorus oxychloride is used as the phosphorus oxyhalide.

19. Process according to claim 14 wherein the reaction with the phosphorus oxychloride is carried out at a temperature between ambient temperature and reflux temperature.

20. Process according to claim 13, wherein, for the preparation of the 8-substituted compounds, the cyclophosphate is reacted with a molecular amount of a halogen in a dilute alkaline solution.

21. Process according to claim 20 wherein said solution is a 0.05–0.5 N solution.

22. Process according to claim 14, wherein, for the preparation of compounds in which Y is a hydrogen atom, neutral conditions are maintained during the halogenation reaction.

23. Process according to claim 13 wherein the halo compound is subsequently reacted with an alcohol or alcoholate to give the corresponding ether.

24. Process according to claim 13 wherein the halo compound is subsequently reacted with ammonia or with a primary or secondary amine to give the corresponding unsubstituted or substituted amino compound.

25. Process according to claim 13 wherein the halo compound is subsequently reacted with hydrazine to give the corresponding hydrazide.

26. Process according to claim 20 wherein the halo compound is subsequently reacted with thiourea or with an alkali metal hydrogen sulphide to give the corresponding sulphhydryl compound.

27. Process according to claim 13 wherein the halo compound is first converted into the corresponding aralkoxy compound and is then split in an acidic medium to give the corresponding hydroxyl compound.

28. Compound as claimed in claim 1 wherein B is hydrogen or amino.

29. Compound as claimed in claim 1 wherein Z is halogen; hydrogen; hydroxyl; unsubstituted amino; alkoxy of from 1 to 8 carbon atoms, aryloxy or aralkyloxy of up to 7 carbon atoms; or —NR$_3$R$_4$ wherein R$_4$ is hydrogen or lower alkyl and R$_3$ is alkyl or alkenyl of up to 5 carbon atoms, phenyl, phenylalkyl wherein the alkyl moiety is from 1 to 4 carbon atoms and wherein said alkyl moiety can be substituted with hydroxy, and substituted aralkyl, wherein the aryl substituent is halogen, alkyl, alkoxy, and contains not more than 4 carbon atoms, N-heterocyclic ring containing from 5 to 7 ring atoms having from 1 to 2 nitrogen atoms and having up to 1 oxygen ring atom.

30. Compound as claimed in claim 1 wherein X is hydrogen; halogen; hydroxyl; aryloxy or aralkyloxy of up to 7 carbon atoms; mercapto, lower alkylmercapto; unsubstituted amino, N—R$_1$—R$_2$ wherein R$_2$ is hydrogen or lower alkyl and R$_1$ is alkyl or alkenyl of up to 5 carbon atoms, phenyl, phenylalkyl, wherein the alkyl moiety is from 1 to 4 carbon atoms and wherein said alkyl moiety can be substituted with hydroxy, and substituted aralkyl wherein the aryl substituent is halogen, alkyl alkoxy, and contains not more than 4 carbon atoms.

References Cited

UNITED STATES PATENTS

| | | | |
|---|---|---|---|
| 2,852,506 | 9/1958 | Goldman et al. | 260—211.5 R |
| 3,040,026 | 6/1962 | Duchinsky | 260—211.5 R |
| 3,074,929 | 1/1963 | Hitchings et al. | 260—211.5 R |
| 3,446,793 | 5/1969 | Jones et al. | 260—211.5 R |

LEWIS GOTTS, Primary Examiner

J. R. BROWN, Assistant Examiner

U.S. Cl. X.R.

424—180

UNITED STATES PATENT OFFICE
CERTIFICATE OF CORRECTION

Patent No. 3,712,885      Dated January 23, 1973

Inventor(s) Gunter Weimann et al

It is certified that error appears in the above-identified patent and that said Letters Patent are hereby corrected as shown below:

Col. 1, line 15

In Priority Data

For      "April 3, 1969"

Read      -- April 30, 1969 --

Col. 2, line 60

Insert      "(I)" next to formula

Col. 4, line 25

For      "deaza"

Read      -- diaza --

Col 11, line 71

For      "mona"

Read      -- monia --

UNITED STATES PATENT OFFICE
CERTIFICATE OF CORRECTION

Patent No. 3,712,885     Dated January 23, 1973

Inventor(s) Gunter Weimann et al

It is certified that error appears in the above-identified patent and that said Letters Patent are hereby corrected as shown below:

Col. 12, Table III, line 18

In Example 6, under heading "Z"

For     "$R_3R_2$=methyl"

Read     -- $R_3=R_2$=methyl --

Cols. 13-14, Table V

For the 6th compound, under column heading "Elektro"

For     "0.68"

Read     -- 0.86 --

Cols. 13-14, Table V

For the 5th compound, from the bottom, under column heading "Neutral 280/260"

For     "22.2"

Read     -- 2.22 --

UNITED STATES PATENT OFFICE
CERTIFICATE OF CORRECTION

Page Three

Patent No. 3,712,885      Dated January 23, 1973

Inventor(s) Gunter Weimann et al

It is certified that error appears in the above-identified patent and that said Letters Patent are hereby corrected as shown below:

Cols. 13-14, Table V

Footnote No. 2

For      "2033b"

Read      -- 2043b --

Col. 13, line 74

For      "3-bromo-d-"

Read      -- 8-bromo-d- --

Col. 17, Table VII

Compound No. 11 (8-morph.....)

For      ":5-MP"

Read      -- "5'-MP --

UNITED STATES PATENT OFFICE

CERTIFICATE OF CORRECTION

Patent No. 3,712,885  Dated January 23, 1973

Inventor(s) Gunter Weimann et al

It is certified that error appears in the above-identified patent and that said Letters Patent are hereby corrected as shown below:

Col 17, Table VII

Compound No. 8 from bottom (8-benzylamino...)

under heading "Neutral, max."

For           "26.5"

Read          -- 265.5 --

Col. 17, Table VIII

Compound No. 6 from bottom (8-mercap...)

under heading "Acidic, 250/260"

For           "22.6"

Read          -- 2.26 --

Col. 18, line 17

For           "contaning"

Read          -- containing --

Signed and sealed this 10th day of July 1973.

(SEAL)
Attest:

EDWARD M. FLETCHER, JR.           Rene Tegtmeyer
Attesting Officer                 Acting Commissioner of Patents